(12) United States Patent  
Peterson

(10) Patent No.: US 6,732,975 B2
(45) Date of Patent: *May 11, 2004

(54) METHOD OF BOARDING PASSENGERS ON REGIONAL AIRCRAFT AND TRANSFERRING PASSENGERS BETWEEN A REGIONAL AIRCRAFT AND LARGER AIRCRAFT

(75) Inventor: Robert Peterson, 2190 E. 3205 S., Salt Lake City, UT (US) 84109

(73) Assignee: Robert Peterson, Salt Lake City, UT (US)

( * ) Notice: Subject to any disclaimer, the term of this patent is extended or adjusted under 35 U.S.C. 154(b) by 467 days.

This patent is subject to a terminal disclaimer.

(21) Appl. No.: 09/960,799
(22) Filed: Sep. 21, 2001

(65) Prior Publication Data

US 2002/0092950 A1 Jul. 18, 2002

Related U.S. Application Data

(63) Continuation-in-part of application No. 09/575,222, filed on May 22, 2000, now Pat. No. 6,315,243.
(60) Provisional application No. 60/141,038, filed on Jun. 24, 1999.

(51) Int. Cl.$^7$ .................................................. B64F 1/32
(52) U.S. Cl. ............................ 244/114 R; 52/32; 52/33
(58) Field of Search ......................... 244/114 R; 52/32, 52/33

(56) References Cited

U.S. PATENT DOCUMENTS 6,315,243 B1 * 11/2001 Peterson ................. 244/114 R

* cited by examiner

Primary Examiner—J. Woodrow Eldred
(74) Attorney, Agent, or Firm—Steven L. Nichols; Rader, Fishman & Grauer PLLC

(57) ABSTRACT

An air travel system preferably uses an airport terminal or concourse that includes at least one regional aircraft boarding pier and at least one boarding bridge for larger aircraft. The regional aircraft boarding pier includes a primary passenger bridge extending from the airport terminal or concourse; a pier hub connected to the primary passenger bridge; and a plurality of secondary passenger bridges connected to, and extending from, the hub. Each secondary passenger bridge has a docking end for docking with a regional aircraft. A method of operating this air travel system includes boarding a passenger on a regional aircraft by sending the passenger through the regional aircraft boarding pier. This may be before or after the passenger also uses a boarding bridge to board a larger aircraft which is a connecting flight in the passenger's travel itinerary. This method allows the passenger to transfer between regional and larger aircraft within a single airport concourse or terminal.

12 Claims, 13 Drawing Sheets

METHOD OF BOARDING PASSENGERS ON REGIONAL AIRCRAFT AND TRANSFERRING PASSENGERS BETWEEN A REGIONAL AIRCRAFT AND LARGER AIRCRAFT

RELATED APPLICATIONS

The present application is a continuation-in-part of a previous application; application Ser. No. 09/575,222, now U.S. Pat. No. 6,315,243, entitled: "Regional Jet Boarding Pier and Method of Using," filed May 22, 2000, and claims the benefit of Provisional Application No. 60/141,038 filed Jun. 24, 1999.

FIELD OF THE INVENTION

The present invention relates to the field of airline travel. More particularly, the present invention relates to the field of boarding passengers using aircraft boarding piers, and specifically to methods of moving passengers through aircraft boarding piers that service smaller, regional aircraft. The present invention provides, among other things, a method of integrating a regional aircraft boarding pier in an airport concourse with existing bridges for larger jet passenger aircraft and a method of moving passengers through the integrated boarding system to provide easy transfer between regional aircraft and larger aircraft.

BACKGROUND OF THE INVENTION

Air travel has becoming increasing popular over the past decade and has evolved to handle an ever-growing passenger volume. An important aspect of this evolution is the structure of flight routes through a "hub" airport. Today, hub routing has become an essential part of the efficient operation of an airline. This trend has been aided by the advent of regional aircraft. As used herein and in the appended claims, the term "regional aircraft" refers to jet or propeller aircraft that are smaller than typical large commercial airline passenger jets and are used to service regional, as opposed to national, passenger routes. Regional aircraft will typically be identified as having about 110 seats or less. Aircraft with substantially more than 110 seats and which are used to travel traditional airline routes between major airports are considered "large" or "larger" aircraft or jets herein. The advent of regional aircraft has created a new market for air travel in which air passengers can span relatively large distances quickly on a regional aircraft at the end or beginning of a trip while using a larger jet to cover the bulk of the trip mileage. Manufacturers of regional aircraft, particularly craft with 50 or fewer seats, include Brazilian aircraft maker Embraer S A, Canada's Bombardier and Fairchild Aerospace of the United States. The popularity of regional aircraft produced by these manufacturers has exceeded expectations. For example, Bombardier forecast initial sales of 400 aircraft when it launched its regional jet model in the early 1900s. Bombardier instead received orders and options for 1,066 of its CRJ-200 50-seater airplane and slightly larger derivative craft. Similarly, Embraer booked dozens more orders than expected for its ERJ-135 and ERJ-145 aircraft at a recent Paris air show.

Capitalizing on this strong commercial interest, Bombardier has launched the CRJ-700, a 70-seat aircraft, and plans an even larger BRJ-X model with 90 or 110 seats. Fairchild has recently launched the 70-seat 728JET and also offers a longer version with around 100 seats. Embraer has also booked orders for its new ERJ-170 and ERJ-190, with about 70 and 100 seats, respectively.

Despite its advantages there is at least on significant problem with regional aircraft travel. The regional aircraft terminal is often located at a site remote from the main terminal that services larger aircraft. Consequently, a passenger on a regional aircraft, whether transferring to or from a larger airplane, needs to traverse the length of the airport and/or travel between terminals to make the transfer. Additionally, the remote location of the regional aircraft terminal also affects airline scheduling for large aircraft because passengers must be allowed time to traverse the often large distances between a regional aircraft boarding gate and the boarding gate for the large aircraft.

As air travel becomes increasingly popular and important to the economy, the frequent regional aircraft passenger represents an increasing share of the air travel market. Consequently, the problems presented by the remote location of the regional aircraft terminal that prevent quick and seamless plane transfers for the regional aircraft passenger must be addressed.

Another problem with regional aircraft travel is that the passenger is frequently required to walk outside on the tarmac and climb stairs to board regional aircraft. If the weather is inclement, boarding and deplaning from a regional aircraft is made more difficult than boarding and deplaning from larger aircraft entirely within the closed and conditioned space of conventional airports which have been developed for large aircraft.

Where a passenger is unable to walk, boarding a regional aircraft from the tarmac in a wheelchair can present additional problems. In the past, these problems have been addressed by building some kind of wheelchair lift. However, such boarding is often time consuming and can be a source of embarrassment or self-consciousness for the wheelchair passenger. The combination of a wheelchair lift and inclement weather may make the prospect of regional aircraft travel even less acceptable for disabled passengers.

Consequently, there is a need in the art to make regional aircraft travel more convenient and efficient. Specifically, as regional aircraft become more prevalent, a need exists to integrate terminals and boarding gates for the regional aircraft with terminals and boarding gates for large aircraft in a manner that overcomes the problems of the prior art.

SUMMARY OF THE INVENTION

The present invention meets the above-described needs and others. Specifically, the present invention provides a method of moving passengers through a regional jet boarding pier system that allows regional jet passengers to transfer quickly between larger aircraft and regional aircraft within, for example, a single terminal or concourse of an airport.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a method of operating an air travel system using an airport terminal or concourse that has at least one regional aircraft boarding pier. The regional aircraft boarding pier includes: a primary passenger bridge extending from the airport terminal or concourse; a pier hub connected to the primary passenger bridge; and a plurality of secondary passenger bridges connected to, and extending from, the hub, each secondary passenger bridge having a docking end for docking with a regional aircraft. The method of the present invention is performed by boarding a passenger on a regional aircraft by sending the passenger through the regional aircraft boarding pier.

Sending the passenger through the regional aircraft boarding pier may also be a step in transferring the passenger to or from the regional aircraft in a travel itinerary that includes both larger and regional aircraft. In on such example, the method may include deplaning the passenger from a regional aircraft by sending the passenger through the regional aircraft boarding pier; and informing the passenger of a designated gate having a boarding bridge for a larger aircraft in the same terminal or concourse, the larger aircraft being the next connecting flight in the travel itinerary of the passenger. The passenger is then through the boarding bridge for the larger aircraft at the designated gate.

Alternatively, where the airport terminal or concourse further has at least one boarding bridge for a larger aircraft, the method may include deplaning the passenger from a larger aircraft by sending the passenger through the boarding bridge for that larger aircraft prior to sending the passenger through the regional aircraft boarding pier. The passenger is then informed of a designated gate at which is located the regional aircraft boarding pier where a connecting flight in a travel itinerary of the passenger on a regional aircraft is or will be boarded.

The present invention may also encompass a method of organizing an air travel system by: identifying a route within the air travel system that is serviced by using both a larger aircraft and a regional aircraft; and locating a connection between the larger aircraft and the regional aircraft in an airport terminal or concourse that includes both a larger aircraft boarding bridge and a regional aircraft boarding pier. The regional aircraft boarding pier referred to has the same components noted above.

This method may also include minimizing the distance between the large aircraft boarding bridge and the regional aircraft boarding pier by having the larger aircraft boarding bridge and the regional aircraft boarding pier in a single airport terminal or having the larger aircraft boarding bridge and the regional aircraft boarding pier in a concourse of interconnected terminals of an airport. Additionally, the method may include constructing an airport terminal or concourse that includes both a larger aircraft boarding bridge and the regional aircraft boarding pier.

BRIEF DESCRIPTION OF THE DRAWINGS

The accompanying drawings illustrate preferred embodiments of the present invention and are a part of the specification. Together with the following description, the drawings demonstrate and explain the principles of the present invention.

In the drawings, identical reference numbers indicate identical items and/or structural elements, regardless of the level of detail provided in any individual drawing.

DETAILED DESCRIPTION OF THE PREFERRED EMBODIMENTS

Using the drawings, the preferred embodiments of the present invention will now be explained. In this explanation, as above, a "large" or "larger" aircraft is an aircraft with substantially more than 110 passenger seats. Large aircraft can be either jet or propeller driven. Examples of large aircraft include the DC-9 or Boeing 7171 at the smaller end of the scale, up to the Boeing 747 or 767 at the larger end of the scale. A "regional aircraft" is an aircraft with a passenger capacity from about 6 to about 110 passengers. Examples of regional aircraft include aircraft made by Bombardier, Embraer, Fairchild Aerospace, Gulf Stream, Cessna, Learjet, and others.

Under a preferred embodiment of the present invention, many of the problems of the prior art can be overcome with a regional aircraft boarding pier, described in detail below, which is integrated into a common concourse with boarding facilities for larger aircraft. As used herein, a "concourse" is a single structure or wing of an airport with sequentially numbered boarding gates for passenger aircraft. The term airport "terminal" is synonymous with concourse or may denote a group of interconnected concourses.

Figure 1:
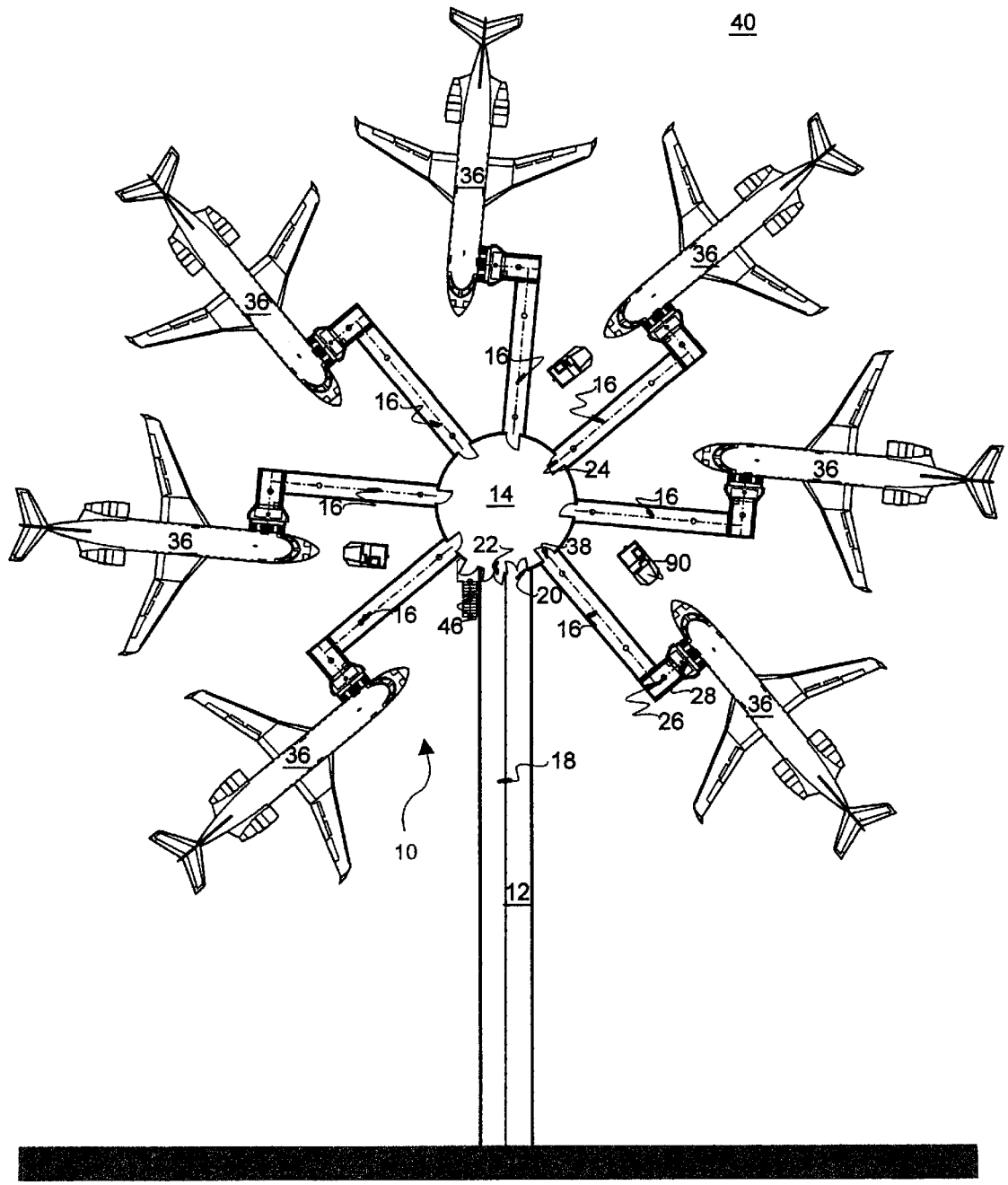
FIG. 1 is plan view of the regional aircraft boarding pier according to the present invention with a plurality of regional aircraft docked thereto.

FIG. 1 is plan view of a regional aircraft boarding pier according to the present invention. As shown in FIG. 1, the regional aircraft boarding pier (10) includes a primary regional aircraft passenger bridge (12). The primary regional aircraft passenger bridge (12) has an appropriate length and width to allow passengers to move between the airport terminal or concourse (30) and the docked aircraft.

A hub (14) is connected to the primary regional aircraft passenger bridge (12). A divider rail (18) may be placed within the primary regional aircraft passenger bridge (12) to allow for simultaneous passenger boarding and deplaning without interference between the two groups of passengers. Preferably, doors (22, 20) are provided for controlling access to the connection between the hub (14) and the primary passenger bridge (12).

A number of secondary regional aircraft passenger bridges (16) are connected to and radiate outward from the pier hub (14). Each secondary regional aircraft passenger bridge (16) has an appropriate length and width to allow passengers to move through the bridge (16) to and from a regional aircraft (36). The length and width of the secondary bridges (16) is preferably smaller than those dimensions of the primary passenger bridge (12).

Each secondary regional aircraft passenger bridge (16) may dock a regional aircraft (36), thereby connecting the aircraft (36) to the hub (14), primary bridge (12) and, ultimately, the airport concourse or terminal (30). The docking portion (26) of each secondary bridge (16) may include a flexible accordion connector (28) to provide a weather-tight fit against the side of the aircraft (36). An emergency exit stairway (46) is preferably connected to hub (14) to allow for immediate egress to the tarmac in the event of an emergency.

In order to accommodate differently sized regional aircraft, the ends (26) of the secondary bridges (16) that dock with the regional aircraft (36) can preferably be adjusted up and down in elevation relative to the tarmac (40). Therefore, the regional aircraft boarding pier (10) is a fixed, elevating structure. Consequently, no tarmac drive is necessarily used to dock the aircraft. Alternatively, a tarmac or apron drive may be used with a regional aircraft boarding pier (10) of the present invention.

Because the opposite ends (e.g., 38) of the secondary bridges (16) are pivotally attached to the hub (14), adjusting the elevation of the docking end (26) of the bridges (16) alters the slope or pitch of the bridge. Preferably, the bridge (16) is maintained with a pitch in the range from level to having one foot of rise or fall for every 12 feet of run. More preferably, the pitch is kept at one foot of rise or fall, or less, for every 20 feet of run. As necessary, the secondary bridges (16) may be pitched outside the preferred range under the principles of the present invention. Where the preferred pitch range is exceeded, hand railings may be installed within each such bridge (16).

Each secondary regional aircraft passenger bridge (16) preferably has a length from about 20 feet to about 80 feet. Most preferably, the length of the bridges (16) is about 40 feet. The width of the secondary regional aircraft passenger bridges (16) is preferably in the range from about four feet to about ten feet. Most preferably, the width of the bridges (16) is about six feet.

The length of the primary regional aircraft passenger bridge (12) is preferably in the range from about 60 feet to about 300 feet. Most preferably, the length is about 180 feet. Other lengths may be preferred depending upon the specific size and configuration of the particular regional aircraft being docked, perhaps as compared with other regional aircraft also being docked.

The pitch for the primary regional aircraft passenger bridge (12) is preferably in the range from level to about one foot of rise or fall for every 12 feet of run. Preferably, the pitch of the primary bridge (12) is about one foot of rise for every 20 feet of run. The preferred width for the primary regional aircraft passenger bridge (12) is about 12 to 20 feet. Most preferably, the width of the primary bridge (12) is about 16 feet.

The hub (14) has an elevation above the tarmac (40) in the range from about two feet to about eight feet. To accommodate wheeled access from ground level, the hub (14) may have an elevation from zero to two feet above the tarmac (4). However, if the hub (14) is situated at ground level, the general length of the secondary bridges (16) will most likely have to be increased to accommodate the rise to the sill height or entry level of a regional aircraft.

Figure 2:
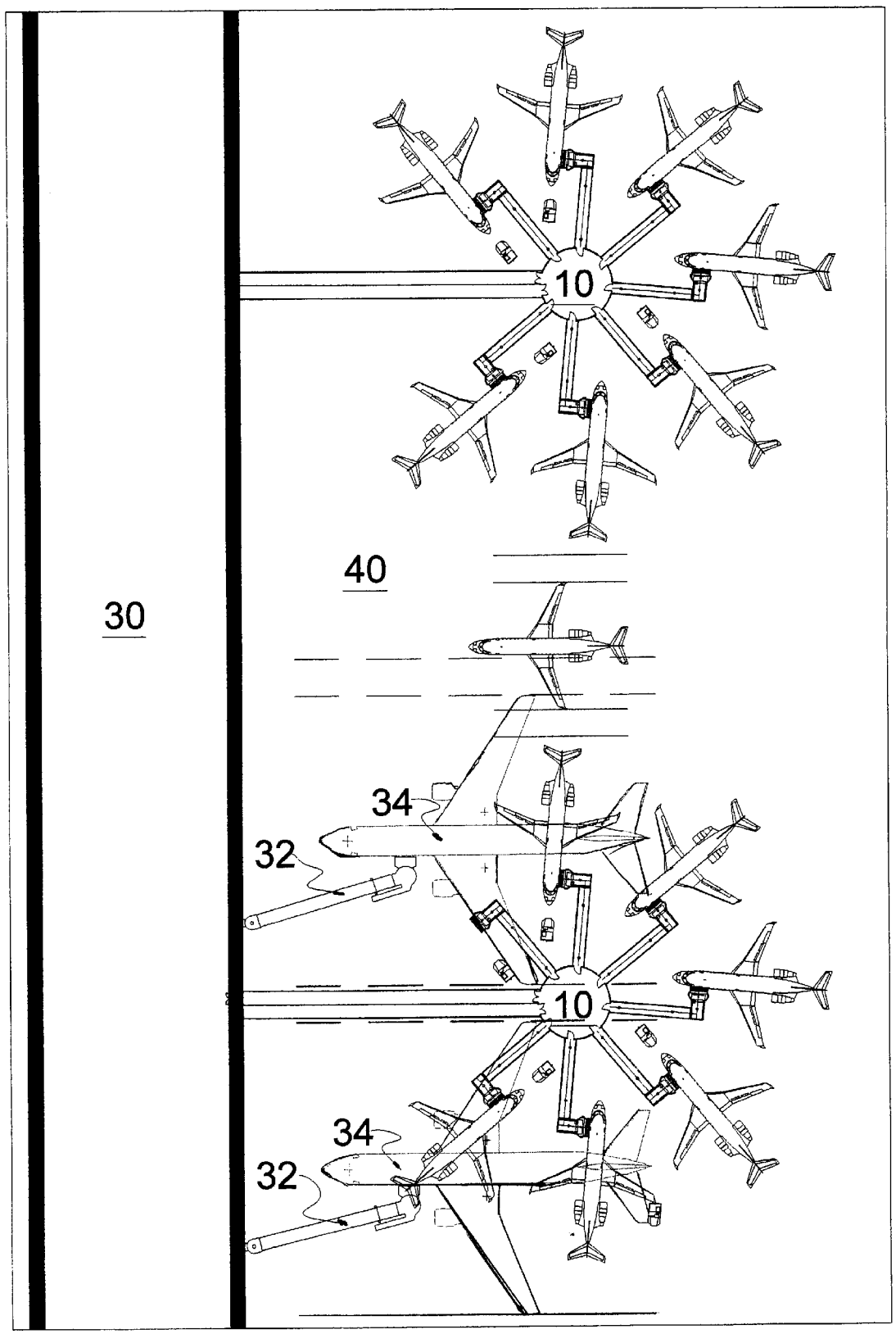
FIG. 2 is plan view of the integration of a regional aircraft boarding pier with a concourse that services large aircraft according to the present invention.

Consequently, the hub (14) has a preferred elevation of about six feet above the tarmac (40). FIG. 2 is plan view illustration of the integration of a regional aircraft boarding pier (10) with a concourse (30) that may also service, or previously serviced, large aircraft (34). As shown in ghost in FIG. 2, a number of large aircraft passenger bridges (32) are provided from the airport concourse (30). As shown in FIG. 2, each large aircraft passenger bridge (32) services a single large aircraft (34). A retrofit of the existing concourse (30), carried out according to the present invention, preferably replaces two of the large aircraft passenger bridges (32) for large aircraft (34) with a regional aircraft boarding pier (10) for a number of regional aircraft. The large passenger bridges (32) and large aircraft (34) which have been replaced are illustrated in ghost in FIG. 2. As will be appreciated by those skilled in the art, the concourse (30) may continue to have a number of large aircraft passenger bridges (32) even after the retrofit installs a regional aircraft boarding pier (10) according to the present invention. (See FIG. 3).

Under this retrofitting method of the present invention, it is also possible to remove only a single large aircraft bridge (32) and replace that bridge (32) with a single regional aircraft boarding pier (10) of the present invention. However, this will likely require greater length in the primary bridge (12) of the pier (10) in order to avoid interference with adjacent boarding facilities. Consequently, removing at least two adjacent large jet passenger bridges (32) is preferred to make room for a single regional aircraft boarding pier (10). FIG. 2 shows the superimposition of the regional aircraft boarding pier (10) over the same real estate on the tarmac (40) as previously occupied by two large jet service areas.

Under the principles of the present invention, the hub (14) of the regional aircraft boarding pier (10) may have a variety of different configurations. Preferably, the hub (14) is a circular structure with a minimum width in the range from about ten to about 40 feet. More preferably, the hub (14) has a minimum width of about 20 feet, although it need not be circular.

Figure 3:
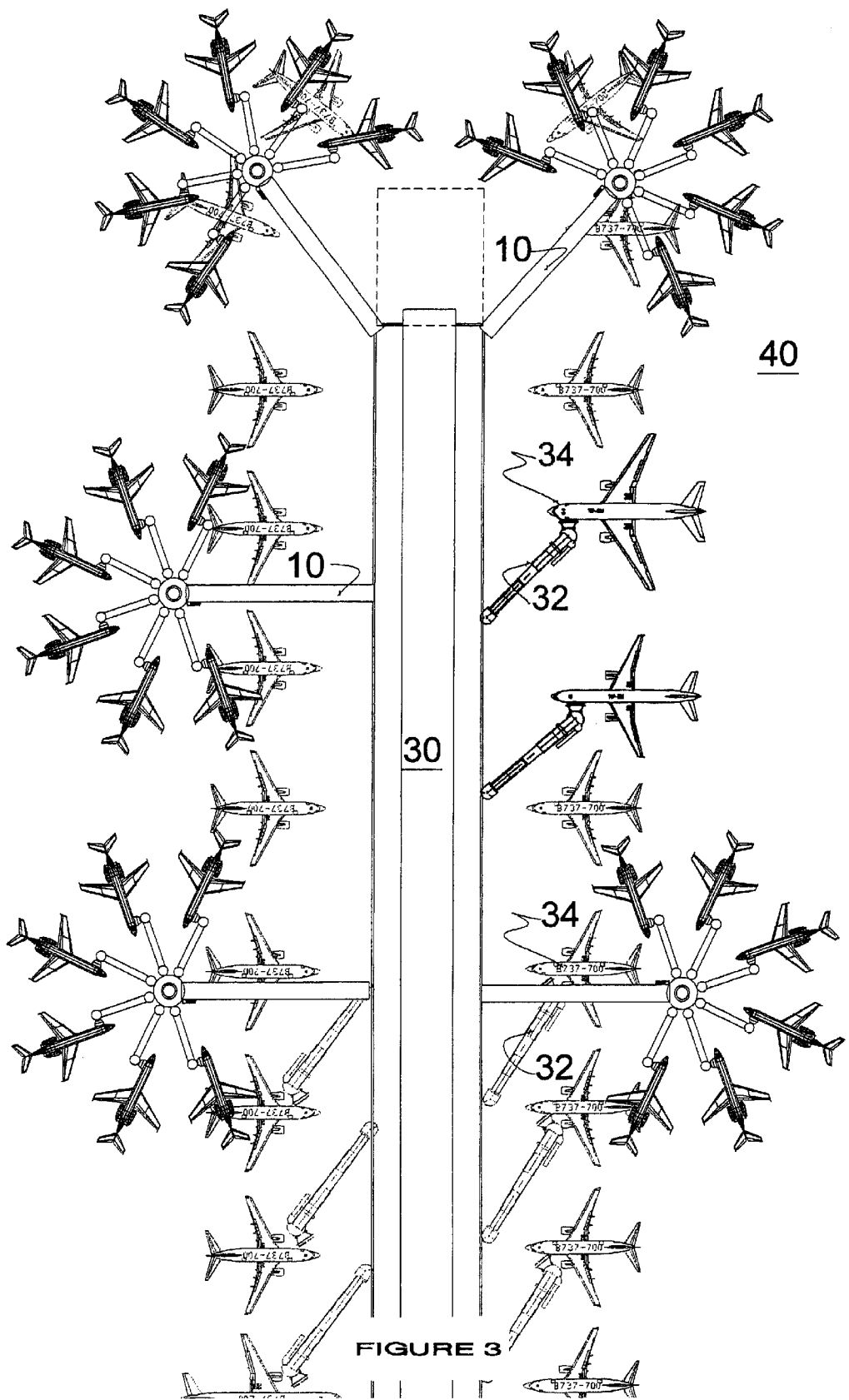
FIG. 3 is a plan view of a concourse according to the present invention in which a number of regional aircraft boarding piers have replaced passenger bridges for larger aircraft, with some passenger bridges for larger aircraft remaining such that both large aircraft and regional aircraft can be docked and loaded at the same concourse.

FIG. 3 further illustrates the concourse (30) where some of the large aircraft passenger bridges (32) that service large aircraft (34) have been replaced by regional aircraft boarding piers (10) according to the present invention. FIG. 3 shows the regional aircraft boarding piers (10) superimposed over the real estate previous occupied by large aircraft service areas. As shown in FIG. 3, equivalent building frontage is occupied by the regional aircraft boarding layout as compared to a comparable large jet parking layout.

Significantly, FIG. 3 also shows large aircraft bridges (32) servicing large aircraft (34) from the same concourse (30) as that to which the regional aircraft boarding piers (10) are connected. Consequently, as noted above, under the principles of the present invention, a single concourse (30) can be made to service both large and regional aircraft.

Referring again to FIG. 1, the optimal density of secondary passenger bridges (16) will now be discussed. As shown in FIG. 1, the present invention may provide, for example, seven secondary regional aircraft passenger bridges (16) from a circular hub (14). A regional aircraft pier with six or seven secondary bridges (16) is the preferred configuration so as to maximize the number of regional aircraft (36) that can be docked through the hub (14). If, however, the operational area for constructing the regional aircraft boarding pier (10) and servicing regional aircraft (36) is restricted to closer to the concourse (30), the number of secondary regional aircraft passenger bridges (16) may be reduced so that the primary bridge (12) can be shortened.

In FIG. 1, the reduction in the number of secondary bridges (16) would preferably be accomplished by removing the two bridges closest to the concourse (30) and the aircraft docked thereto. With only five remaining secondary bridges (16) connected to the hub (14), the primary regional aircraft passenger bridge (12) can be substantially shortened to accommodate available space.

The regional aircraft boarding pier (10) illustrated in FIG. 1 has an operational footprint that occupies an area of about 360 feet by about 360 feet. The operational footprint refers to the space around the regional aircraft boarding pier (10) within which regional aircraft may move. Typically, the allowable size of the operational footprint around the regional aircraft boarding pier (10) is determined by the regulations of the Federal Aviation Administration (FAA) or its counterpart agencies in countries other than the United States. In some preferred embodiments, the footprint of the regional aircraft boarding pier (10) may occupy a smaller area, for example, 150 ft by about 300 ft.

The building frontage required by the regional aircraft boarding pier (10) is also reduced per passenger seat by the present invention. Preferably, the regional aircraft boarding pier (10) occupies an operational building frontage of about 360 feet.

Returning to FIG. 2, where a regional aircraft boarding pier (10) according to the present invention is substituted for two existing large aircraft bridges (32), it is desirable to avoid any decrease is passenger capacity. In other words, the number of seats on the regional aircraft (36) docked at the pier (10) should be roughly equal to the number of seats on two large aircraft so that the regional aircraft boarding pier (10) services an equivalent number of regional aircraft passenger seats in about the same tarmac area and building frontage occupied as would have been serviced by two large aircraft passenger bridges (32) connecting to two wide-body large aircraft. Consequently, the regional aircraft boarding pier (10) preferably services about 400 to 500 regional aircraft passenger seats distributed among approximately six or seven regional aircraft.

Figure 4:
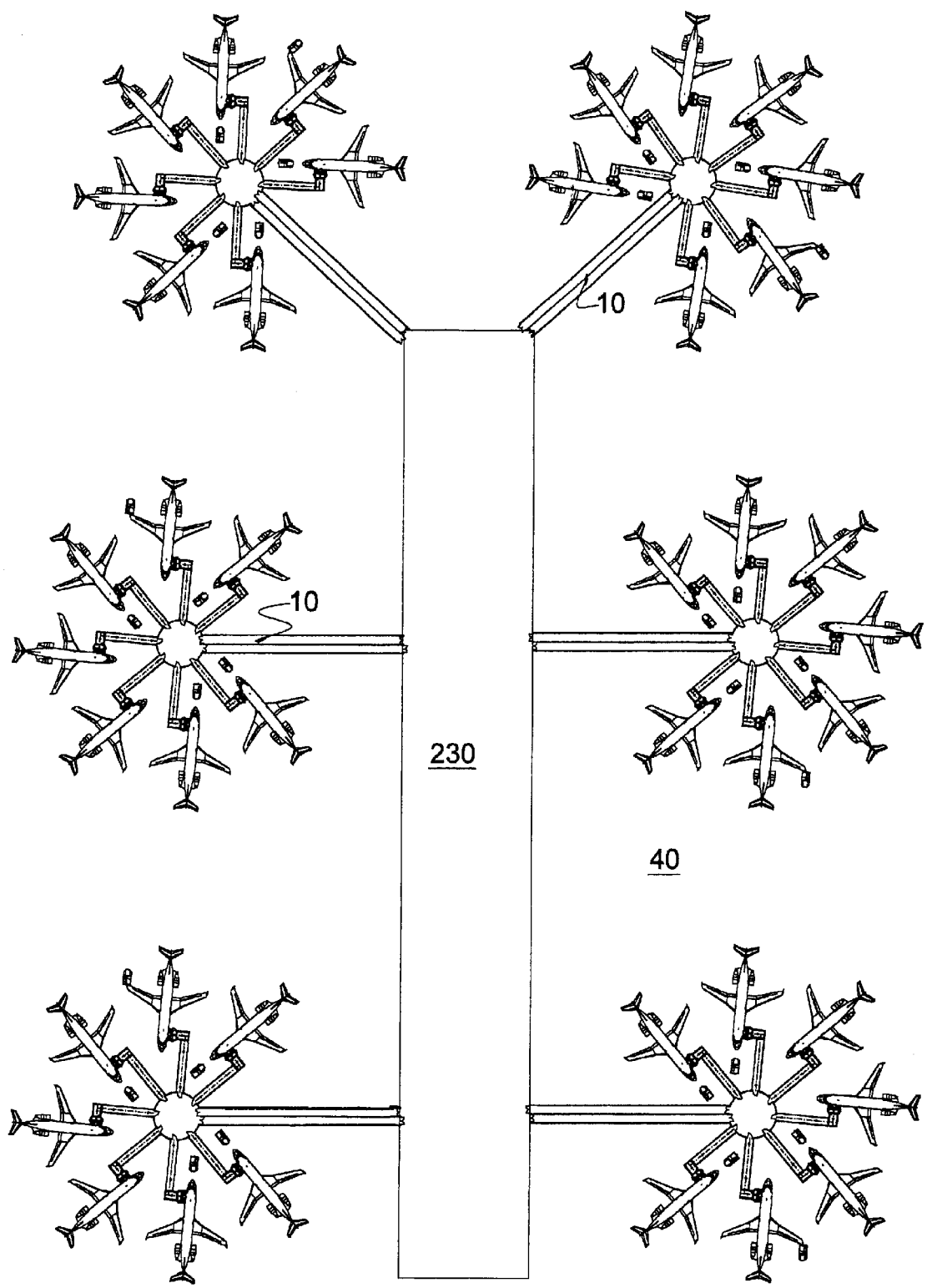
FIG. 4 is a plan view of an embodiment of the present invention in which a number of regional aircraft boarding piers are attached to a rectangular concourse.
Figure 5:
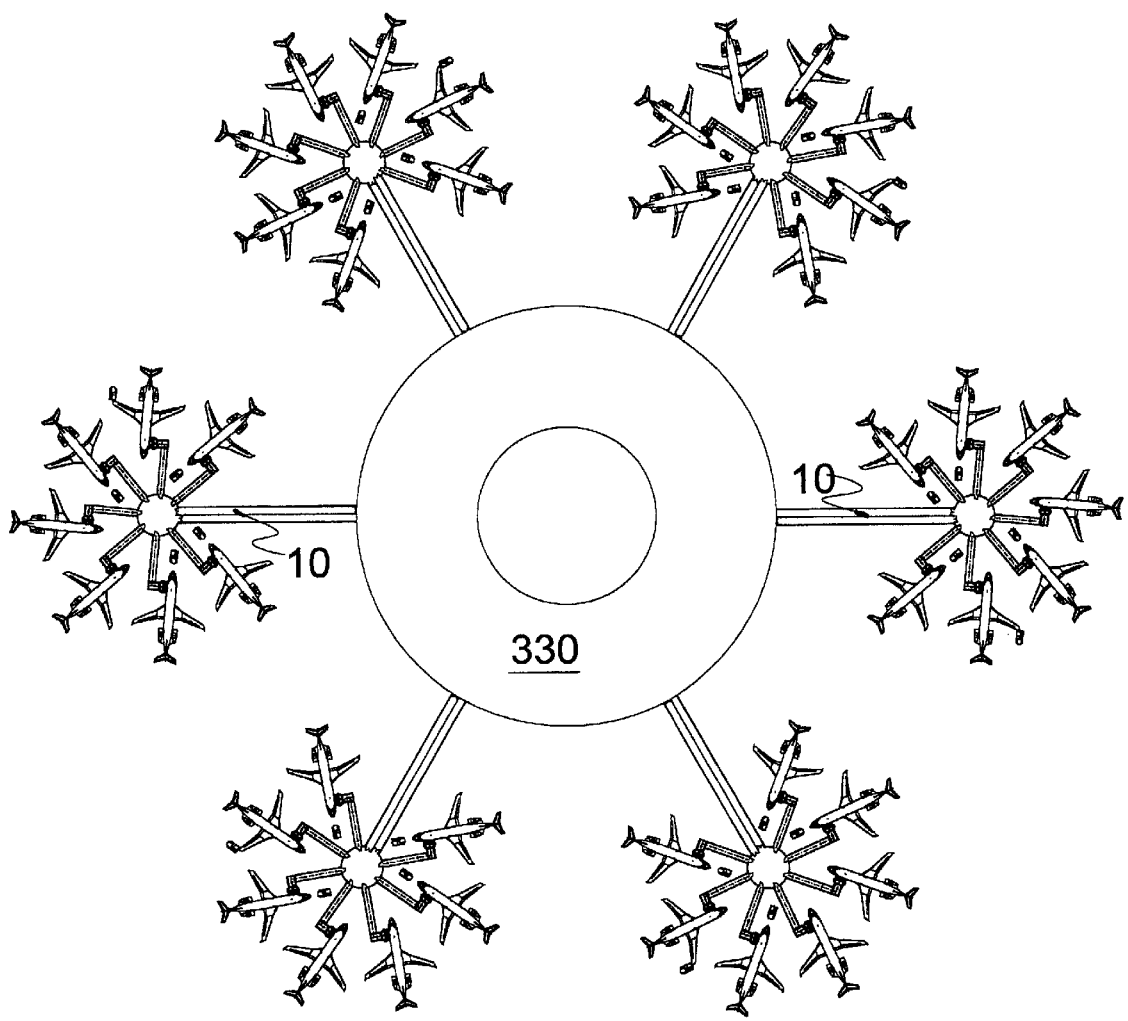
FIG. 5 is a plan view of an embodiment of the present invention in which a number of regional aircraft boarding piers are attached to a circular concourse.

FIG. 4 illustrates a number of regional aircraft boarding piers (10) according to the present invention that are connected to an elongated airport concourse (230). FIG. 5 illustrates a number of the regional aircraft boarding piers (10) according to the present invention that are connected to a circular airport concourse (330). The regional aircraft piers (10) of the present invention can be used with any concourse or terminal configuration. Either concourse, the rectangular (230) or circular (330), may be a midfield concourse or may be structurally connected to a larger concourse network. Alternatively, the concourse, either midfield or networked, may be a curved structure.

Figure 6:
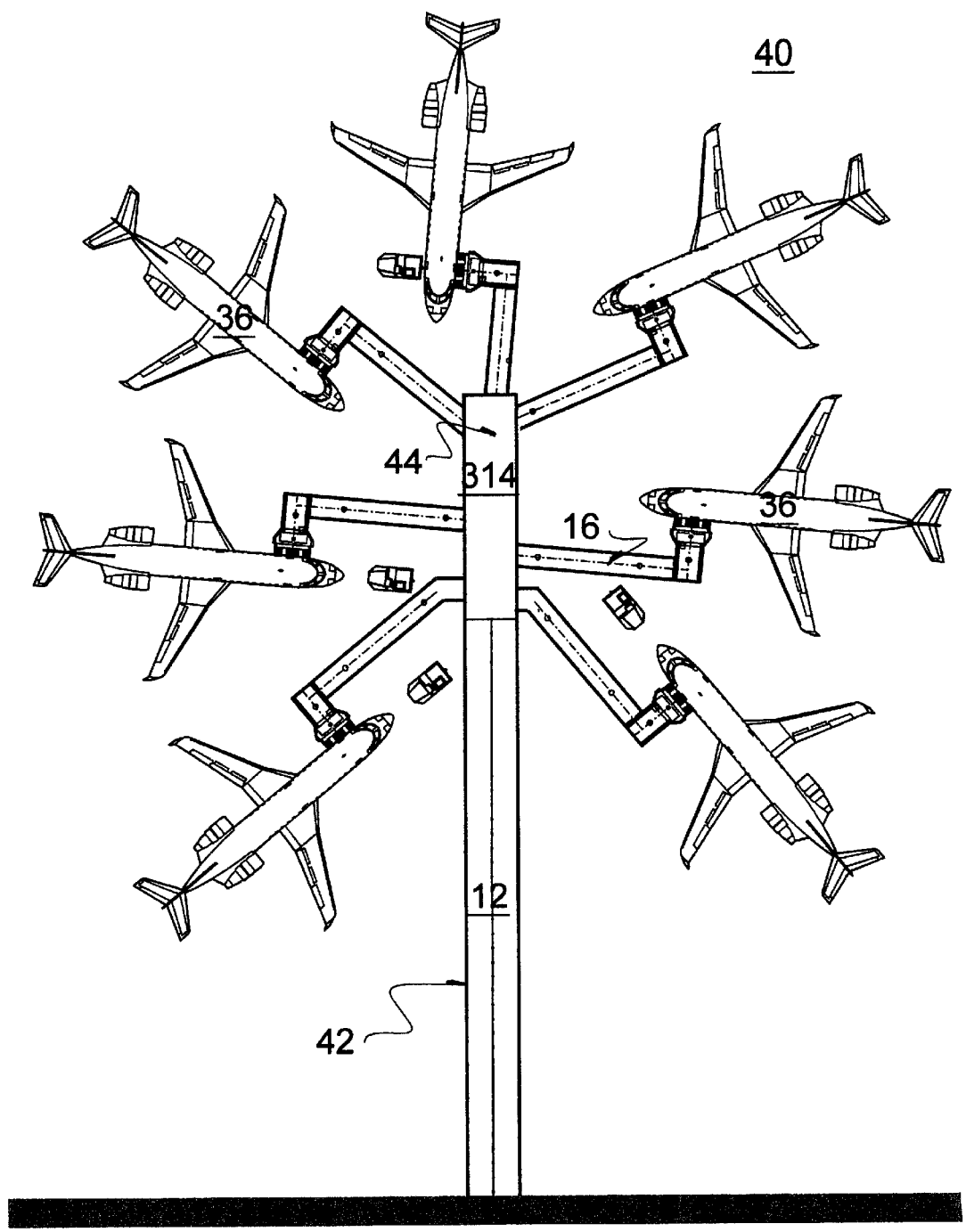
FIG. 6 is plan view of an embodiment of the present invention in which a hub supporting a number of regional aircraft boarding bridges has an elongated configuration.

Alternative hub configurations for the regional aircraft pier of the present invention will now be discussed. FIG. 6 is plan view of another embodiment of the present invention in which the hub (314) between the primary bridge (12) and the secondary bridges (16) has an elongated configuration. As shown in FIG. 6, the primary regional aircraft passenger bridge (12) and the hub (314) may have parallel elongated walls (42) and (44), respectively. The width of the hub (314) may be the same as the primary bridge (12) or may be wider to better accommodate passenger movement between secondary bridges (16).

Figure 7:
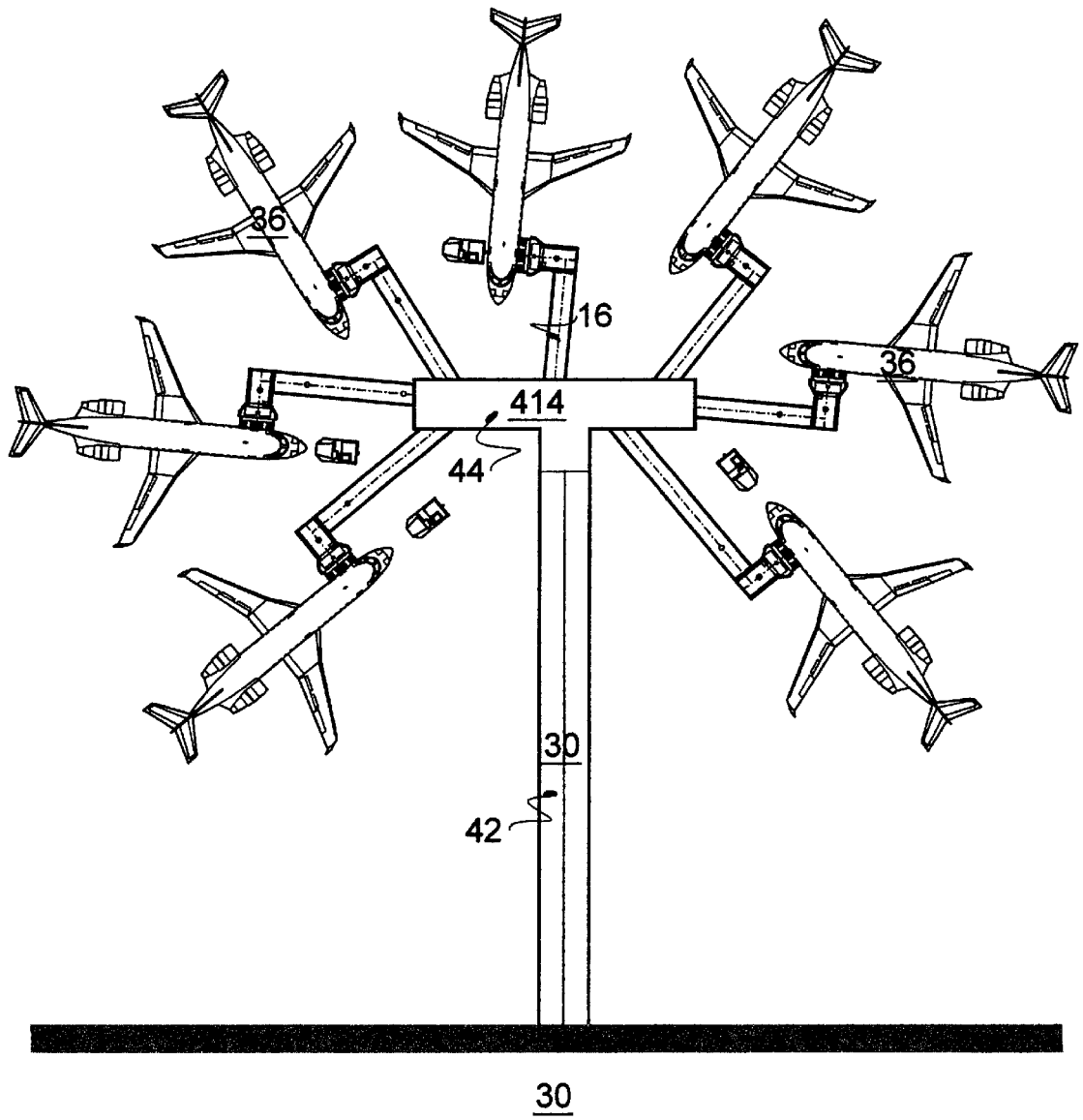
FIG. 7 is a plan view of an embodiment of the present invention in which a hub supporting a number of regional aircraft boarding bridges has an elongated configuration that is situated orthogonal to a principal passenger bridge.

FIG. 7 is a plan view of still another embodiment of the present invention in which the hub (414) has an elongated configuration that is arranged orthogonally to the primary regional aircraft passenger bridge (12). The primary regional aircraft passenger bridge (12) and hub (414) have orthogonal elongated walls (42) and (44), respectively. While in the preferred embodiment of FIG. 7, the elongated hub (414) is orthogonal to the primary passenger bridge (12), the elongated hub (414) could be disposed at any non-zero angle with respect to the primary passenger bridge (12) to accommodate existing structures and obstacles.

Figure 8:
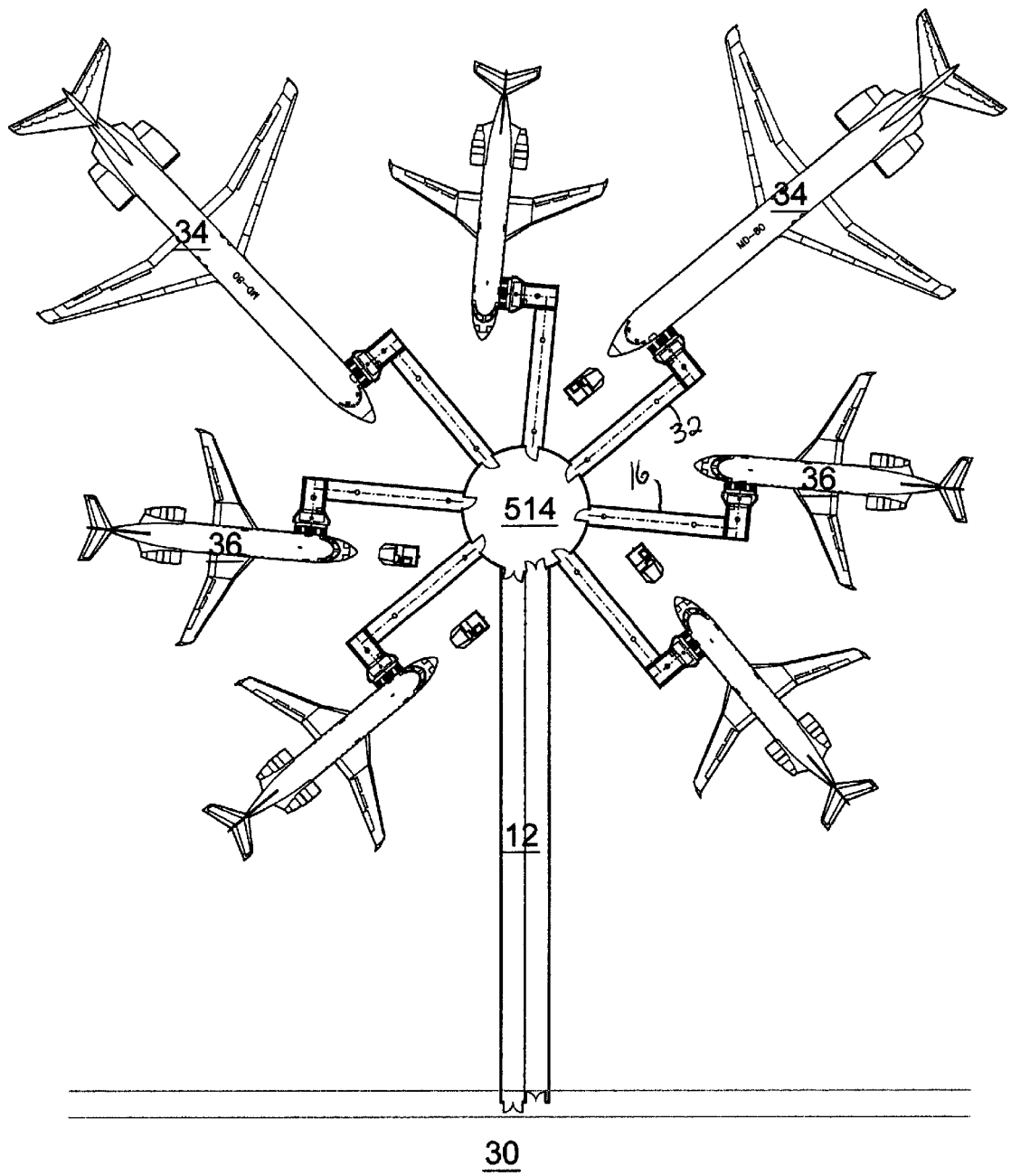
FIG. 8 is a plan view of an embodiment of the present invention in which the boarding pier includes accommodation for large aircraft or larger regional aircraft.

FIG. 8 illustrates another method encompassed by the present invention in which large and regional aircraft can be serviced at the same concourse. As shown in FIG. 3, both regional aircraft piers (10) and large aircraft bridges (32) can be provided from a common concourse (30) to support, respectively, regional and large aircraft. Additionally, as shown in FIG. 8, the aircraft pier (10) of the present invention can, in a second embodiment, include a hub (514) from which extend both secondary bridges (16) for docking regional aircraft (36) and large aircraft bridges (32) for docking large aircraft (34). In order to accommodate large aircraft bridges (32), the number of secondary bridges (16) on the hub (514) can be reduced or the length of the large aircraft bridges (32) can be extended to allow the interspersing of large and regional aircraft as shown, for example, in FIG. 8.

Figure 9:
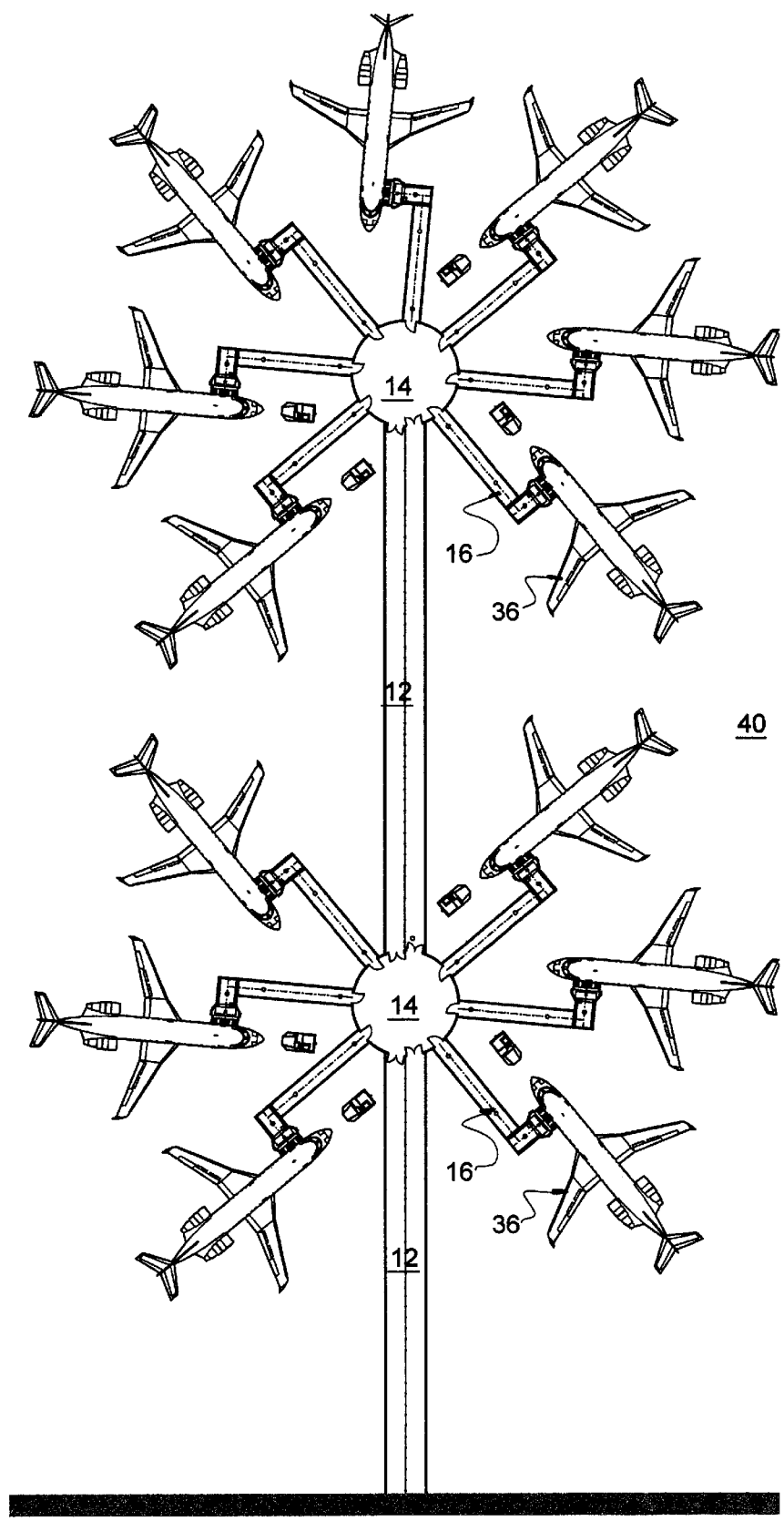
FIG. 9 is a plan view of an embodiment of the present invention in which a second regional aircraft boarding pier is supported by the hub of a first regional aircraft passenger bridge.

FIG. 9. Illustrates another embodiment of the present invention in which multiple hubs (14) are provided as part of a single regional aircraft pier (110). As shown in FIG. 9, a first hub (14A) is connected to an airport concourse (30) by a first primary passenger bridge (12A). A number of secondary passenger bridges (16) extend from the first hub (14A) to dock with regional aircraft (36). A second primary passenger bridge (12B) also extends between the first hub (14A) and a second hub (14B). A second group of secondary passenger bridges (16) extend from the second hub (14B). In this way, a larger number of secondary bridges (16) and docking slips for regional aircraft (36) are provided. Given the space limitations of the particular site in question, any number of additional hubs could be connected by primary passenger bridges (12) according to the principles illustrated in FIG. 9.

A distinct advantage of the present invention is that in each embodiment, the primary regional aircraft passenger bridge (12), the hub (14, 314, 414), and the plurality of secondary regional aircraft passenger bridges (16) are an enclosed space that can be heated or air-conditioned as necessary to enhance passenger comfort. Additionally passengers can quickly transfer between large and regional aircraft without being required to leave the common airport concourse which services both types of aircraft. The passenger can also experience a seamless transition between aircraft where the regional aircraft boarding pier of the present invention is used for transfers between two regional aircraft.

Additionally, the present invention allows the airline staff to be more efficient. As the aircraft are more closely docked, it becomes easier to provide equipment and personnel to service and maintain the aircraft. Consequently, fewer staff members are required to service the same number of aircraft. Similarly, the sharing of aircraft support equipment can decrease the overall need for equipment. For example, a single 400 Hz generator could service up to seven regional aircraft or more. Additionally, a single conditioning air unit could service up to seven regional aircraft or more. This shared support equipment could be conveniently housed beneath the hub of the regional aircraft boarding pier (10, 110) of the present invention.

Figure 10:
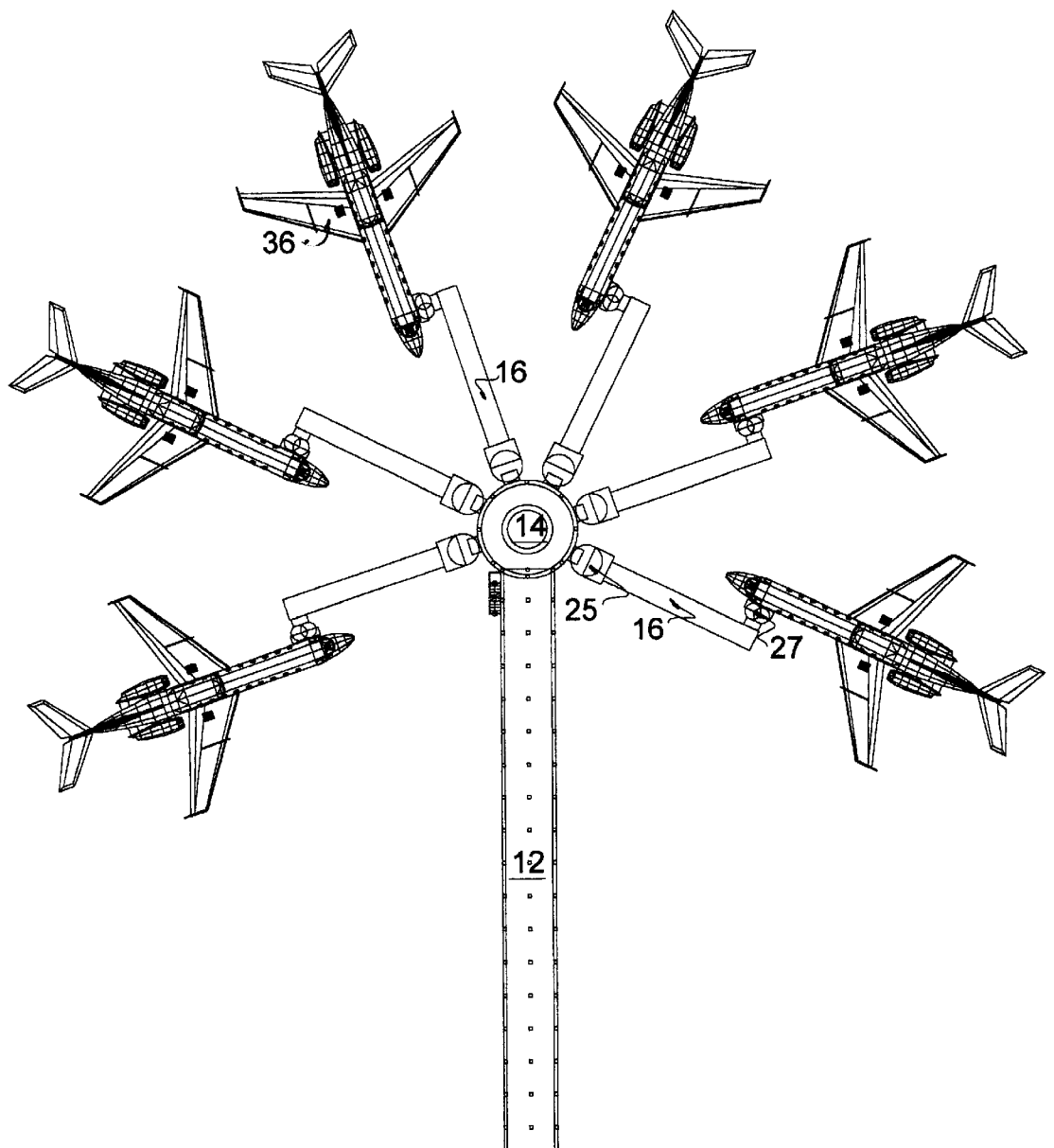
FIG. 10 is a plan view of an embodiment of the present invention in which each secondary passenger bridge pivots with respect to the hub to accommodate a docked aircraft.

FIG. 10 illustrates another embodiment of the present invention in which the secondary passenger bridges (16) extending from the hub (14) are pivotally connected to the hub (14) through a primary hinge point (25). The hinge point (25) pivotally connects the secondary passenger bridge (16) to the hub (14) so that the secondary passenger bridge (16) can pivot around the primary hinge point (25). In this way, the secondary passenger bridge (16) can be driven so that the docking end (27) of the secondary passenger bridge (16) can be swung toward or away from a docking aircraft (36) while the hinge point (25) maintains a passable connection with the hub (14) through which passengers can move.

The hinge point (25) which allows the secondary passenger bridge (16) to pivot make it easier and faster to dock an aircraft (36) with the boarding pier of the present invention. The aircraft (36) need not be carefully parked at the boarding facility within the range of an extending aircraft adapter, such as a flexible accordion connector (28; FIG. 1). Rather, the aircraft need only be parked with a sill or door located along the arc that can be subscribed by one of the secondary passenger bridges (16). Preferably, the aircraft is oriented substantially tangentially to that arc subscribed by the secondary passenger bridge (16).

Figure 11:
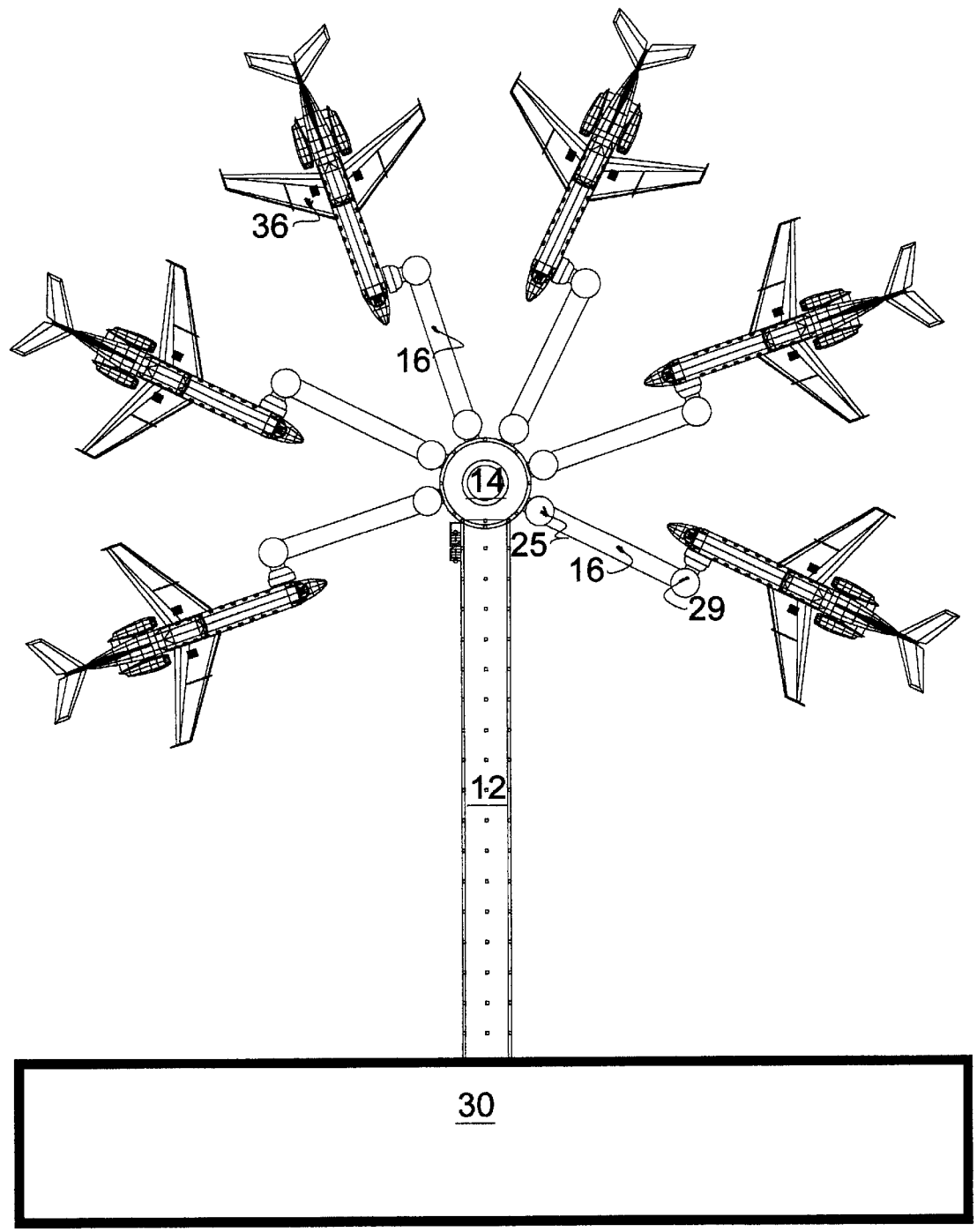
FIG. 11 is a plan view of an embodiment of the present invention in which each secondary passenger bridge pivots with respect to the hub and also has an aircraft adapter which pivots with respect to the end of the secondary passenger bridge to accommodate a docked aircraft.

FIG. 11 illustrates another embodiment of the present invention in which each secondary passenger bridge (16) extending from the hub (14) is pivotally connected to the hub (14) through a primary hinge point (25). The secondary hinge point (25) illustrated in FIG. 11 is identical to the primary hinge point described above with respect to FIG. 10, i.e., the hinge point (25) pivotally connects the secondary passenger bridge (16) to the hub (14) so that the secondary passenger bridge (16) can pivot around the primary hinge point (25).

In this way, the secondary passenger bridge (16) can be driven so that the docking end (27) of the secondary passenger bridge (16) can be swung toward or away from a docking aircraft (36). Additionally, as shown in FIG. 11, the docking end of each passenger bridge (16) includes a secondary hinge point (29) that pivotally connects an aircraft adapter (27) with the docking end of the secondary passenger bridge (16). Consequently, the aircraft adapter (27), which may include, for example, a flexible accordion connector (28; FIG. 1), can be pivoted about secondary hinge point (29) with respect to the docking end of the secondary passenger bridge (16).

This further decreases the precision with which a docking aircraft (36) must be positioned with respect to the docking pier of FIG. 11 and consequently decreases the time required to complete the docking. The aircraft (26) is parked with a sill or door located along the arc that can be subscribed by one of the secondary passenger bridges (16). It is not necessary, however, that the aircraft (36) be tangential or even substantially tangential to the arc. The orientation of the aircraft with respect to the arc subscribed by one of the secondary passenger bridges (16) is of little importance because the aircraft adapter can be pivoted about secondary hinge point (29) to match the orientation of the docking aircraft, thereby flexibly providing an optimal connection between the aircraft (26) and the aircraft adapter (27). Alternatively, the secondary hinge point (29) can be implemented in a secondary passenger bridge (16) without the concurrent use of a primary hinge point (25). The primary and secondary hinge points (25, 29) can be driven with hydraulics or other motor devices in a manner that will be clear to those skilled in the art.

As described above, the present invention provides a number of significant advantages over the prior art and addresses the problems of the prior art described above. For example, where a passenger is wheelchair bound, no lift is needed to accommodate boarding and deplaning of a regional aircraft under the principles of the present invention. Additionally, the wheelchair bound passenger can remain in a closed and conditioned space and is not subject to inclement weather or transferring to a remote concourse. Passengers have the same experience transferring between regional aircraft as has conventionally been the case transferring between large aircraft within the concourse system of a major airport. Moreover, the inventive design disclosed herein allows a per passenger seat cost that is competitive with large aircraft boarding bridges.

Figure 12:
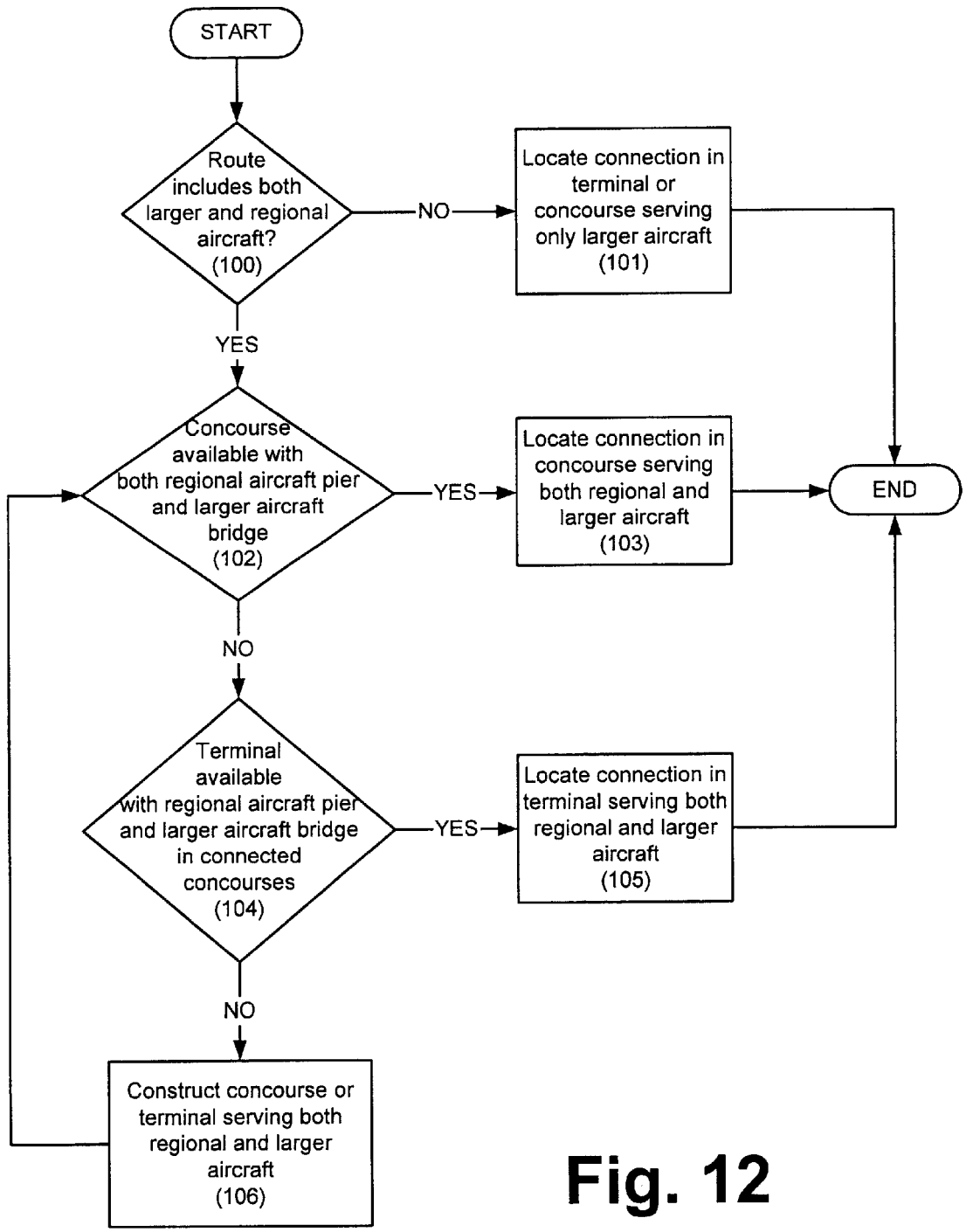
FIG. 12 is a flowchart illustrating a method according to the present invention of organizing an airline traffic system using the boarding structures of the present invention.

FIG. 12 is a flowchart illustrating a method according to the present invention of organizing an airline traffic system using the boarding structures of the present invention. The method illustrated in FIG. 12 can be carried out by a computer or computer system and appropriate software. The creation of such a system and software will be within the ambit of one of ordinary skill in the art with the aid of this disclosure. As shown in FIG. 12, an airline may organize an air route according to the present invention may identifying significant travel or commuter routes that involve the use of both regional and larger aircraft (100). In only larger aircraft are involved, flight connections can be located according to traditional methods (101).

If the route is best serviced by a combination of regional and larger aircraft, the method next looks for an available concourse with at least one conventional larger aircraft boarding bridges and at least one regional aircraft pier of the present invention (102). If such a concourse is available, the airline can locate the connection between the larger aircraft and the regional aircraft in that concourse (103). Consequently, passengers on the route can transfer between the larger and regional aircraft within a single concourse. Thus, the passenger need not take extensive time or effort to travel to another location to make the flight connection. Additionally, the passenger need not be affected by inclement weather in making the connection.

If a single concourse serving both larger and regional aircraft is not available, the airline can look for a terminal (a collection of interconnected concourse) which includes at least one large aircraft boarding bridge and at least one regional aircraft pier of the present invention (104). If such a terminal is available, the airline can locate the connection between the larger aircraft and the regional aircraft in that terminal (105). Consequently, passengers on that route can still transfer relatively quickly and conveniently between the larger and regional aircraft that service the route.

Finally, if the appropriate facilities are not available for optimizing the flight connection on the route employing both larger and regional aircraft, the airline can consider constructing the necessary facilities according to the principles of the present invention (106). The airline or airport authority may construct either a single concourse serving both regional and larger aircraft or a terminal of interconnected concourses serving both regional and larger aircraft.

Figure 13:
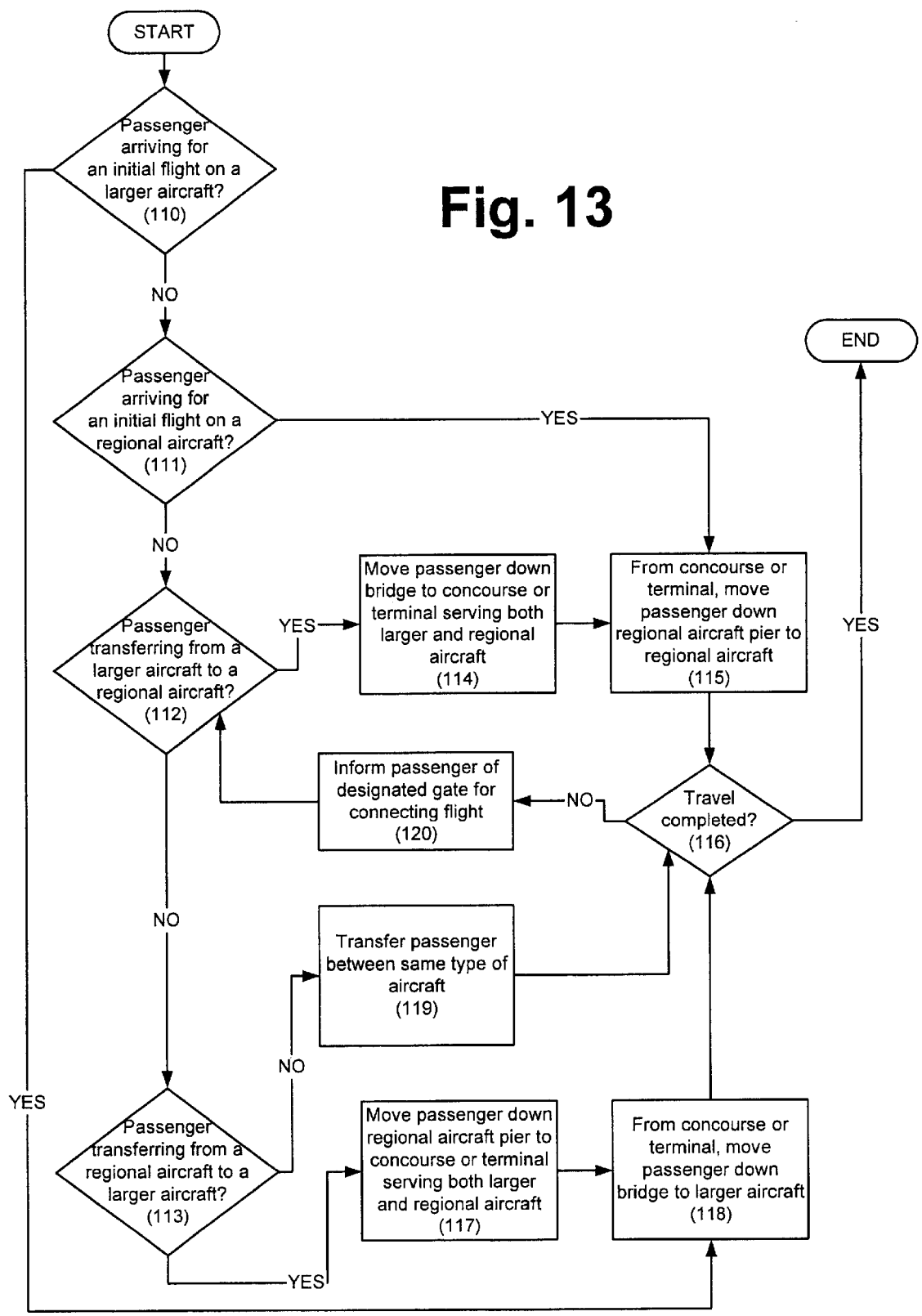
FIG. 13 is a flowchart illustrating a method according to the present invention of operating an airline traffic system using the boarding structures of the present invention.

Once the airline routes are in place using the method of FIG. 12, the system can be operated under the principles of the present invention using the method outlined in FIG. 13. FIG. 13 is a flowchart illustrating a method according to the present invention of operating an airline traffic system using the boarding structures of the present invention.

As shown in FIG. 13, a passenger may arrive for an initial flight on either a larger aircraft (110) or a regional aircraft (111). If the passenger is using a larger aircraft, the passenger will be moved from the concourse or terminal down a large aircraft bridge to the appropriate aircraft (118). If the passenger is using a regional aircraft, the passenger will be moved from the concourse or terminal down a regional aircraft boarding pier according to the present invention to the regional aircraft (115).

After that initial flight, if the passenger's travel is completed (116), the method ends. However, if the passenger must then catch a connecting flight, the method proceeds depending on whether the passenger is transfer to a regional aircraft or a larger aircraft. In either event, the passenger is informed of the designated gate for his or her connecting flight (120).

If the passenger is transferring from a larger aircraft to a regional aircraft (112), the passenger is moved from the larger aircraft down a passenger bridge to the concourse or terminal that serves both larger and regional aircraft (114). The passenger is made aware of a gate assignment for his or her connecting flight on a regional aircraft. The passenger then goes to the regional aircraft pier, as described above, and moves from the concourse or terminal down the pier to the designated regional aircraft (115).

If the passenger is transferring from a regional aircraft to a larger aircraft (113), the passenger is moved from the regional aircraft down a regional aircraft pier, as described above, to the concourse or terminal that serves both larger and regional aircraft (117). The passenger is made aware of a gate assignment for his or her connecting flight on a larger aircraft. The passenger then goes to the designated passenger bridge for the larger aircraft and moves from the concourse or terminal down the bridge to the aircraft (118).

Alternatively, the passenger may be transferring between regional aircraft or between larger aircraft (119). Where this is the case, the transfer is made using the appropriate type of bridge or pier to deplane the passenger and board the passenger to the connecting aircraft.

When travel is completed (116), the process ends. Otherwise, the process can continue with the passenger making as many connections as necessary between any combination of regional and larger aircraft.

Consequently, the present invention provides airlines with an improved method of routing, moving, deplaning and boarding passengers with routes that include the use of both regional and larger aircraft. The time required to move between planes of different size types is minimized and the effects of inclement weather and the inconvenience to disabled passengers is also minimized.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of operating an air travel system using an airport terminal or concourse that comprises at least one regional aircraft boarding pier, wherein said regional aircraft boarding pier comprises:
   a primary passenger bridge extending from said airport terminal or concourse;
   a pier hub connected to the primary passenger bridge; and
   a plurality of secondary passenger bridges connected to, and extending from, said hub, each secondary passenger bridge having a docking end for docking with a regional aircraft;
   said method comprising boarding a passenger on a regional aircraft by sending said passenger through said regional aircraft boarding pier.

2. The method of claim 1, wherein said sending said passenger through said regional aircraft boarding pier further comprises deplaning said passenger from a regional aircraft by sending said passenger through said regional aircraft boarding pier; said method further comprising:
   informing said passenger of a designated gate having a boarding bridge for a larger aircraft in the same terminal or concourse, said larger aircraft being a connecting flight in a travel itinerary of said passenger.

3. The method of claim 2, said method further comprising sending said passenger through said boarding bridge for said larger aircraft at said designated gate.

4. The method of claim 1, wherein said airport terminal or concourse further comprises at least one boarding bridge for a larger aircraft, said method comprising sending said passenger through said boarding bridge for a larger aircraft before or after sending said passenger through said regional aircraft boarding pier.

5. The method of claim 4, further comprising deplaning said passenger from a larger aircraft by sending said passenger through said boarding bridge for that larger aircraft prior to sending said passenger through said regional aircraft boarding pier.

6. The method of claim 5, further comprising informing said passenger of a designated gate at which is located said regional aircraft boarding pier where a connecting flight in a travel itinerary of said passenger on a regional aircraft is or will be boarded.

7. A method of organizing an air travel system, said method comprising:
   identifying a route within said air travel system that is serviced by using both a larger aircraft and a regional aircraft; and
   locating a connection between said larger aircraft and said regional aircraft in an airport terminal or concourse that includes both a larger aircraft boarding bridge and a regional aircraft boarding pier;
   wherein said regional aircraft boarding pier comprises:
   a primary passenger bridge extending from said airport terminal or concourse;

a pier hub connected to the primary passenger bridge; and a plurality of secondary passenger bridges connected to, and extending from, said hub, each secondary passenger bridge having a docking end for docking with a regional aircraft.

8. The method of claim 7, further comprising minimizing a distance between said larger aircraft boarding bridge and said regional aircraft boarding pier.

9. The method of claim 8, further comprising having said larger aircraft boarding bridge and said regional aircraft boarding pier in a single airport terminal.

10. The method of claim 9, further comprising having said larger aircraft boarding bridge and said regional aircraft boarding pier in a concourse of interconnected terminals of an airport.

11. The method of claim 7, further comprising constructing an airport terminal or concourse that includes both a larger aircraft boarding bridge and said regional aircraft boarding pier.

12. A system of organizing an air travel system, said method comprising:

means for identifying a route within said air travel system that is serviced by using both a larger aircraft and a regional aircraft; and means for locating a connection between said larger aircraft and said regional aircraft in an airport terminal or concourse that includes both a larger aircraft boarding bridge and a regional aircraft boarding pier;

wherein said regional aircraft boarding pier comprises:

a primary passenger bridge extending from said airport terminal or concourse;

a pier hub connected to the primary passenger bridge; and a plurality of secondary passenger bridges connected to, and extending from, said hub, each secondary passenger bridge having a docking end for docking with a regional aircraft.

* * * * *